Nov. 10, 1953     A. HYMAN     2,658,998

MEANS FOR COMPARING TWO VOLTAGES

Filed Aug. 22, 1950

INVENTOR

ABRAHAM HYMAN

BY

ATTORNEY

Patented Nov. 10, 1953

2,658,998

UNITED STATES PATENT OFFICE 2,658,998

MEANS FOR COMPARING TWO VOLTAGES

Abraham Hyman, New York, N. Y.

Application August 22, 1950, Serial No. 180,887

5 Claims. (Cl. 250—27)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to improvements in electric systems for dealing with recurring pulses of energy, and more particularly to means for comparing pulse voltages.

Engineers dealing in pulse techniques often have the task of comparing magnitudes of pulses. A difference voltage might be used to actuate an alarm or activate other circuits. Or a difference voltage between a known reference and an unknown might be the measure of the magnitude of the unknown. In the past this has been accomplished by use of transformers or by impressing the respective pulses on the grids of two tubes with the plates of the tubes in parallel. But the transformer method is subject to limitations in band width. Tube systems have elements in them of undetermined life, and the necessity of having balanced tubes when one must be replaced often introduces practical difficulties.

It is therefore an object of this invention to provide a means for comparing two electric pulses which are effective over a wide bandwidth.

It is a further object of this invention to provide a means for comparing two pulse voltages which is rugged, not liable to get out of adjustment, and not subject to the difficulties arising from the need of balanced tubes.

Other objects are apparent from the description and drawings.

These objects are accomplished by this invention which compares first and second pulse voltages by combining means for inverting said first pulse voltage; means for separating said first pulse voltage from the inverted first pulse voltage; means for adjusting the time of the inverted first pulse voltage and the said second pulse voltage; resistor means for mixing the inverted first pulse voltage and the second pulse voltage.

The invention can be clearly understood by referring to the following description and accompanying drawings of which:

Figure 1:
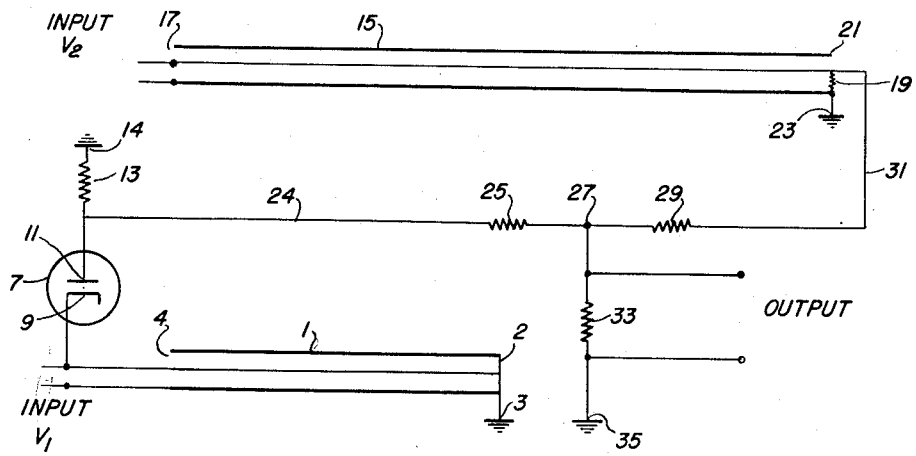
Fig. 1 is a circuit diagram of a preferred embodiment of the invention.

In a preferred embodiment illustrated in Fig. 1, a delay line 1 with one end 2 closed is provided as a means for inverting the first of two input pulse voltages. The closed end 2 of the delay line 1 is grounded at 3. The open end 4 of this delay line 1 is adapted to receive the first input pulse.

Suitable means are provided for separating the input first pulse from the inverted first pulse. Such means may take the form of a diode 7, with its cathode 9 connected to the open end 4 of delay line 1, and with its anode 11 connected through a biasing resistor 13 to ground at 14.

Suitable means are also provided for adjusting the timing of the inverted first pulse and the second pulse. In the embodiment shown in Fig. 1, this is accomplished by an open end delay line 15 into which the second input pulse voltage is fed at 17 and which is twice as long as the closed end delay line 1. A terminal resistor 19 is connected across the output end 21 of the open end delay line 15, and one end of the terminal resistor 19 is grounded at 23.

Finally, means are provided for mixing the inverted first pulse and the second pulse. The simplicity and cheapness and effectiveness of resistor means makes such means a preferred one and such means are illustrated in Fig. 1. A direct connection 24 extends from the anode 11 of diode 7 to one terminal of a first isolation resistor 25. The second terminal 27 of the isolation resistor 25 is common with the first terminal of a second isolation resistor 29. There is a direct connection 31 from the second terminal of second isolation resistor 29 to the ungrounded end of the terminal resistor 19. A mixing or output resistor 33 has one terminal connected to the common terminal 27 of isolation resistors 25 and 29, and the other to ground 35, and is adapted to have the output comparison voltage taken from its terminals.

Resistor 13 will normally be of a proper order for biasing purposes. Resistor 19 will normally be designed to match the impedance of the delay line 15 which it terminates. Resistors 25 and 29 will be large so as to be effective isolation resistors—on the order of 100,000 ohms. The output resistor 33 will normally be designed to match the circuit into which it works.

Figure 2:
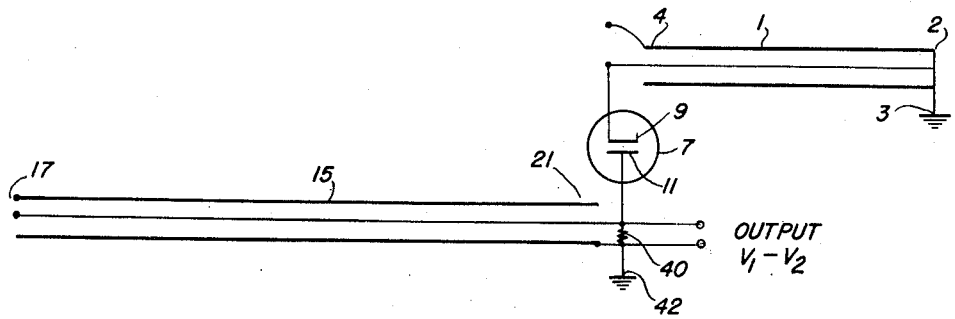
Fig. 2 is a circuit diagram of a second and somewhat simplified embodiment.

In the operation of the invention two pulses to be compared are fed into the two inputs on delay lines 1 and 15, respectively, at 4 and 17, respectively. The first input pulse, fed to delay line 1, will travel the length of the delay line 1, be reflected and inverted at the closed end 2, and will arrive back at the input end 4 as a negative pulse at the same time that the positive second input pulse traveling the length of the longer open end delay line 15 will arrive at the terminal resistor 19. The reflected negative pulse emanating from the closed end delay line 1 will pass through diode 7 while the initial positive input pulse would not. Hence the only voltage impressed across resistor 13 is the negative first pulse, while the voltage impressed at the same time across terminal resistor 19 is the positive second pulse. These pulses meet at common terminal 27 where the one subtracts from the other, and their difference appears across output resistor 33.

Where there is a proper relationship between the two input signals, it is possible to make one resistor serve the purpose of all the resistors in the embodiment illustrated in Fig. 1 and described above. Such an alternative embodiment is illustrated in Fig. 2. There is still a closed end delay line 1 adapted to receive a first input pulse. The same diode 7 has its cathode 9 connected to open end 4 of delay line 1, and its anode 11 connected to one terminal of a resistor designated 40 in Fig. 2. The other terminal of resistor 40 is grounded at 42. There is also the same open end delay line 15, adapted to receive a second input pulse at 17. The output terminals of delay line 15 are connected across the resistor 40.

In the operation of this alternative embodiment, input pulses may be fed into delay lines 1 and 15 as before. The first input pulse will reflect at the closed end of delay line 1, and return to the diode 7 as a negative pulse as before. When it passes the diode 7, it is fed directly to the resistor 40 which serves as a biasing resistor for diode 7, as the terminating resistor for open end delay line 15, and as the source of output voltage. The second input pulse will pass through delay line 15 and arrive at resistor 40 at the same time as the negative reflection of the second input pulse. The two will be mixed, and the difference between the two will appear across the terminals of resistor 40 which serve as the output terminals of the circuit.

The advantages of this system are obvious. Most any desired bandwidth can be obtained by proper design of the delay lines in accordance with the present conventional procedures. There are no pairs of tubes which have to be balanced so the proper operation of this circuit is assured.

It is apparent that many modifications may be made in the embodiments herein described without departing from the scope of the invention. It is to be understood, therefore, that the above description is to be construed as illustrative only, and is not to be construed in any limiting sense.

What is claimed is:

1. A means for comparing two voltages comprising: an open end delay line with terminating resistor means at its output end; a delay line closed at one end and of half the length of said open end delay line; a diode with cathode connected to the open end of said closed delay line and anode connected through a bias resistor to ground; a mixing circuit comprising three resistors connected to each other in Y, the first being further connected to the anode of the diode, the second being further connected to the output end of the open end delay line, and the third being further connected to ground.

2. A means for comparing two voltages comprising: an open end delay line; an output resistor connected across one end of the open end delay line, said resistor being grounded at one end; a diode with anode connected to the ungrounded end of the output resistor; a delay line closed at one end and grounded at the closed end and connected at the open end to the cathode of the diode.

3. A means for comparing first and second pulse voltages of like polarity comprising, in combination, time delay means for deriving a pulse voltage of inverted polarity from the first pulse voltage; means for blocking the passage of the first pulse voltage from said time delay means while passing the pulse voltage of inverted polarity therefrom; time delay means for adjusting the timing of the second pulse voltage relative to that of said pulse voltage of inverted polarity; and resistor means for mixing said second pulse voltage and said pulse voltage of inverted polarity and deriving a difference potential therefrom.

4. A combination according to claim 3, in which the first mentioned time delay means comprises a delay line closed at one end, and in which the second time delay means comprises an open end delay line of twice the length of the closed end delay line.

5. A combination according to claim 3, in which the resistor means for mixing the second pulse voltage and the pulse voltage of inverted polarity has a high impedance compared to the impedance of the time delay means.

ABRAHAM HYMAN.

References Cited in the file of this patent

UNITED STATES PATENTS

| Number | Name | Date |
| --- | --- | --- |
| 2,118,626 | Smith | May 24, 1938 |
| 2,227,906 | Kellogg | Jan. 7, 1941 |
| 2,266,154 | Blumlein | Dec. 16, 1941 |
| 2,437,313 | Bedford | Mar. 9, 1948 |
| 2,510,054 | Alexander et al. | June 6, 1950 |
| 2,546,371 | Peterson | Mar. 27, 1951 |